United States Patent [19]

Groeneweg

[11] Patent Number: 4,651,708
[45] Date of Patent: Mar. 24, 1987

[54] PORTABLE CAMPFIRE AND GRILL

[76] Inventor: Ronald L. Groeneweg, 232 6th Ave. SE., Sioux Center, Iowa 51250

[21] Appl. No.: 725,361

[22] Filed: Apr. 19, 1985

[51] Int. Cl.⁴ .............................................. F24B 3/00
[52] U.S. Cl. ......................................... 126/30; 126/59
[58] Field of Search ..................... 126/25 R, 225, 224, 126/29, 30, 26, 9 R, 9 A, 9 B, 50, 59, 59.5

[56] References Cited

U.S. PATENT DOCUMENTS

| | | | |
|---|---|---|---|
| 594,645 | 11/1897 | Nordinger | 126/25 R |
| 1,279,033 | 9/1918 | Stollberg | 126/25 R |
| 2,001,360 | 5/1935 | Heuston | 126/224 |
| 3,316,892 | 5/1967 | Hanke | 126/25 R |
| 3,851,639 | 12/1974 | Beddoe | 126/25 R |

FOREIGN PATENT DOCUMENTS 397287 8/1933 United Kingdom ................ 126/224

Primary Examiner—Larry Jones
Attorney, Agent, or Firm—David C. Larson

[57] ABSTRACT

A portable campfire and grill for outdoor use is provided. The preferred embodiment has an outer protective screen to help prevent hot sparks and embers from damaging the adjacent ground and to help protect children from coming too close to the flames. An interior grate system is also provided to contain the fire and baffle heat to help protect the underlying ground from scorching. The apparatus can be used as a contained campfire or as an outdoor barbecue by placing a grill over the fire.

1 Claim, 2 Drawing Figures

PORTABLE CAMPFIRE AND GRILL

BACKGROUND OF THE INVENTION

The invention relates generally to outdoor recreational wood burning devices and more particularly to a portable campfire and cooking grill combination for use in residential areas, as well as in parks and campgrounds.

Those who enjoy outdoor recreation, particulary outdoor cooking and campfire related activities have long been acquainted with the difficulties and inconveniences encountered with building an open campfire. Typically, the individual or family must travel to a public recreational area which permits campfires, transporting all of the necessary equipment, wood and food with them to the location. Often times these recreational facilities permit fires only in designated area, and if the facility is crowded, the latecomers may be precluded from enjoying a campfire. Additionally, privacy may be limited in these public areas due to the number of people wishing to utilize the facility, particularly when optimum weather conditions exist. Also, many parks require a user fee, which must be paid before gaining access to the facility.

Alternatively, the individual or family can choose to stay at home and cookout, but except for the limited number of people who live on farms and/or acreages, the enjoyment of a campfire is denied. Most zoning regulations and city ordinances prohibit open burning, and even if it is allowed, the homeowner risks the possiblity of the fire accidently spreading or at best, damaging the yard in the area where the fire is contained.

In the past, many different types of cookers have been developed for outdoor barbecuing, with the majority being of the charcoal or natural gas variety. Although these cookers are well suited to their particular purpose, they are designed primarily for cooking and not for the aesthetics and warmth provided by a campfire.

With the increased costs of transportation and increased usage of limited public areas, individuals and families have a need for equipment that provides recreational enjoyment in their own back yard.

SUMMARY OF THE INVENTION

Accordingly, the present invention provides a portable campfire and grill for outdoor use in the user's own yard or other desired location.

An object of the present invention is to provide a portable device for burning a controlled and contained campfire.

Another object is to provide a portable campfire device with a heat baffle to protect the ground or grass located beneath the fire.

A further object of the invention is to provide a campfire device that helps protect children from coming too close to an open flame.

Still another object is to provide an adjustable grill for cooking over an open flame.

Yet another object is to provide a campfire containing device that allows full aesthetic enjoyment of a campfire with only minimal obtrusive interference.

Other object, advantages and novel features of the present invention will become apparent from the following detailed description of the invention when considered in conjunction with the accompanying drawings.

BRIEF DESCRIPTIONS OF THE DRAWINGS

DESCRIPTION OF THE PREFERRED EMBODIMENT

Figure 1:
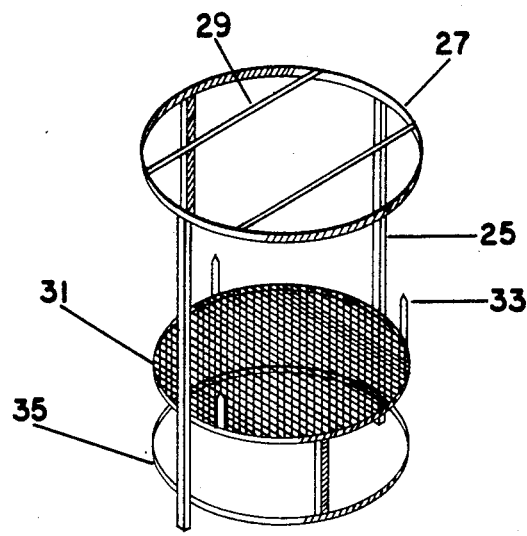
FIG. 1 is an isometric view showing the inner portion of the campfire device that functions as a grate for the fuel and framework for the grill.

Referring now to the drawings wherein like reference numerals designate identical or corresponding parts throughout the several views, FIG. 1 shows the portable campfire of the present invention indicated generally at 10. For simplicity and clarity, the reference numerals designating the inner portion of the portable campfire 10 are shown only in FIG. 1.

As shown in FIG. 1, the inner portion of the portable campfire 10 consists of a baffle 35, a grate 31 and a grill frame 27, held in a generally parallel relationship by inner unit verticle supports 25. The grill frame 27 has two chords 29 for supporting and stabilizing a grill (not shown) on the grill frame. In the preferred embodiment, a standard 24" grill will cooperate with the grill frame 27 to provide a cooking surface, although it is understood that the size of the grill frame 27 can be varied without detracting from the spirit of the invention. For raising and lowering the cooking surface, the verticle supports 25 can be extended or shortened between the grate 31 and the grill frame 27 by telescoping or similar means as well known in the art.

The grate 31 has tabs 33 spaced around its perimeter to help maintain logs or other fuel on the grate 31 during the burning process. In the preferred embodiment, the drawings disclose three tabs 33 equally spaced around the grate 31 perimater, but it is understood that the number of tabs 33 and their configurations can be varied without adversely affecting the containment function.

The purpose of the grate 31 is to support the logs or other fuel during the burning process and allow air to circulate to the fire from beneath. Any configuration such as webbing, generally parallel bars or the like is sufficient so long as there is sufficient thickness and temper to prevent damage from the heat of the fire. Additionally, the grate 31 can be of a concave configuration as well as a planer configuration.

The baffle 35 serves a duel function as an ash catcher for ashes which fall through the grate 31 and as a heat insulator to prevent excessive heat from radiating downward below the portable campfire 10. The baffle 35 consists of a metal shell surrounding a nonflammable heat insulting material such as sand, light weight concrete or the like. In the preferred embodiment the verticle supports 25 extend down below the baffle 35 to create an air space between the baffle 35 and the base of the outer unit upon which it sits. This air space further aids in preventing heat from damaging the ground below the portable campfire 10.

Figure 2:
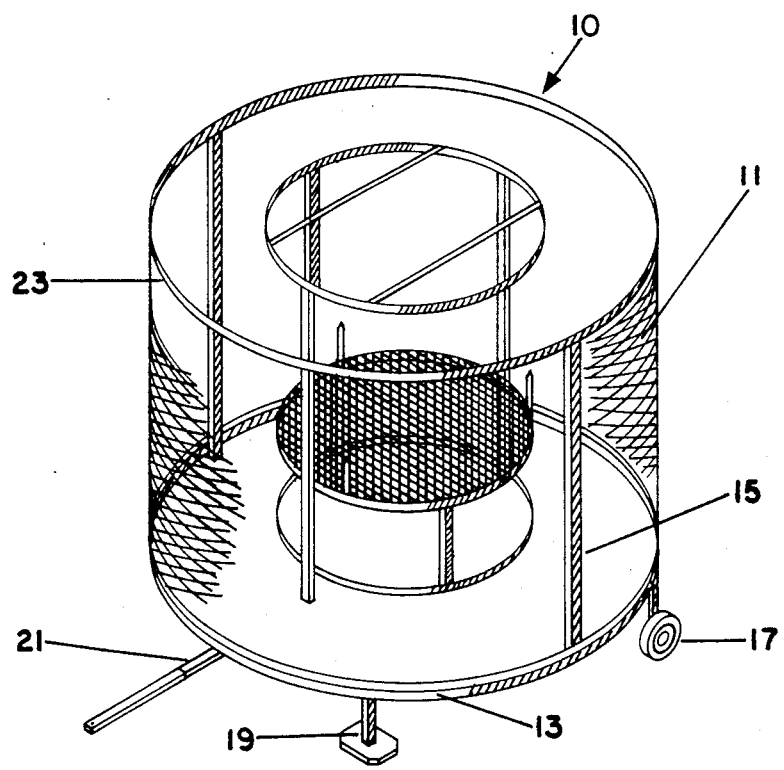
FIG. 2 is an isometric view showing the inner portion of FIG. 1 in its cooperative relationship with the portable outer container.

As can best be seen in FIG. 2 the portable campfire 10 has an outer unit consisting of a screen 11 supported on the top by an upper frame 23, on the bottom by the perimeter of a base 13 and vertically by verticle supports 15. The screen 11 is constructed of a wire mesh in the preferred embodiment, but any configuration and material that is permeable to light and heat and nonflammable will function equally as well.

The base 13 is nonflammable and solid to prevent hot ashes and sparks from falling to the ground below. The base 13 is mounted on two wheels 17 (far wheel not shown) and a support leg 19 to support the portable campfire 10 above the ground. The wheels 17 and support leg 19 can be telescopically mounted to serve as levelers when the portable campfire 10 is used on uneven terrain. A tongue 21 is mounted on the base 13 for pulling the portable campfire 10 in cooperation with the wheels 17. Two handles (not shown) are mounted opposite each other on both the upper frame 23 and the base 13 for lifting the portable campfire 10 into a pickup truck or trailer for transport from site to site.

In the normal position as shown in FIG. 2, the inner unit is located near the center of the outer unit, but it can be freely moved from side to side as desired, or completely removed for cleaning.

In the preferred embodiment the portable campfire 10 is shown as being generally cylindrical, but it is understood that other geometric configurations can be used without detracting from the spirit of the invention.

I claim:

1. An apparatus for use as a campfire holder and outdoor barbecue comprising:
   a plurality of vertical supports forming the frame of an independent interior portion of the apparatus;
   a heat baffle affixed horizontally near the bottom of the support;
   a grate for holding firewood affixed horizontally to the supports above the baffle;
   a grill frame adjustably mounted horizontally at the top of the supports for supporting a cooking grill;
   a base located beneath the vertical supports forming the base of an independent outer screening portion of the apparatus;
   a screen affixed around the perimeter of the base and extending upward therefrom;
   two wheels rotatably attached to the bottom of the base;
   a support leg which cooperates with the wheels to hold the base a sufficient distance above the ground to create an airspace under the base; and
   a tongue swivelly attached to the base for connecting the apparatus to a draft vehicle.

* * * * *